United States Patent [19]
Lang

[11] Patent Number: 5,171,544
[45] Date of Patent: Dec. 15, 1992

[54] METHOD OF MIXING FLUIDS IN PACKING MEDIA FOR REACTORS

[76] Inventor: John S. Lang, 1105 S. Mayflower, Arcadia, Calif. 91006

[21] Appl. No.: 824,909

[22] Filed: Jan. 22, 1992

Related U.S. Application Data

[63] Continuation of Ser. No. 636,575, Jan. 2, 1991, abandoned, which is a continuation-in-part of Ser. No. 151,420, Feb. 2, 1988.

[51] Int. Cl.⁵ ................................. B01F 3/04
[52] U.S. Cl. ................................... 422/224; 422/310; 261/DIG. 72
[58] Field of Search ............... 422/224, 310, 311, 143; 261/94, 98, 106, DIG. 11, DIG. 72 X

[56] References Cited

U.S. PATENT DOCUMENTS 3,419,253 12/1968 Eckert ........................... 422/311 X
4,240,814 12/1980 Regehr et al. .................... 55/440 X
4,708,852 11/1987 Helbling, Jr. et al. ............. 422/220

FOREIGN PATENT DOCUMENTS 2726723 1/1979 Fed. Rep. of Germany .
2945870 11/1979 Fed. Rep. of Germany ...... 422/310

*Primary Examiner*—Lynn M. Kummert
*Attorney, Agent, or Firm*—Christie, Parker & Hale

[57] ABSTRACT

A chemical reactor comprises packing media which promotes plug flow through the reactor. The packing media comprises a plurality of stacked plates, each plate comprising an array of upwardly protruding dimples separated by downwardly protruding dimples. The plates are stacked with the down dimples lying above the up dimples of the plates below to thereby form rows of compartments. The up dimples comprise four transfer ports to provide even flow of fluid from a compartment in one row to each of the adjacent compartments in the adjacent rows. The method achieves plug flow in the reactor and causes two fluids to mix by the use of turbulence and shear at each transfer port.

18 Claims, 3 Drawing Sheets

METHOD OF MIXING FLUIDS IN PACKING MEDIA FOR REACTORS

CROSS-REFERENCE TO RELATED APPLICATIONS

This is a continuation of U.S. patent application Ser. No. 07/636,575, filed Jan. 2, 1991, now abandoned, which was a continuation-in-part of U.S. patent application Ser. No. 07/151,420, filed Feb. 2, 1988, still pending.

FIELD OF THE INVENTION

This invention relates to chemical reactors and more particularly to a chemical reactor comprising a stacked-plate packing media which promotes plug flow within the reactor and a method of mixing fluids in the reactor.

BACKGROUND OF THE INVENTION

A variety of industrial processes comprise one or more process steps which require the use of a chemical reactor. Such a process step may involve, for example, a chemical reaction, gas absorption, distillation or the like.

Many types of reactors are known. Batch reactors involve a reactor chamber in which, once fluid particles, e.g. the reactants, have been added to the chamber, flow neither enters nor leaves the reactor. The contents are mixed until the reaction is complete and then the reactor is emptied and the process repeated.

A plug flow reactor is one in which fluid particles enter, pass through and are discharged from the reactor in the same sequence. In such a reactor, all of the fluid particles remain in the reactor for about the same length of time.

In a continuous stirred tank reactor (CSTR), particles entering the reactor are dispersed immediately throughout the reactor. Accordingly, the particles are discharged from the tank in proportion to their statistical population. In this type of reactor, all fluid particles do not have about the same retention time within the reactor.

Packed bed reactors are reactors which are filled with a packing media, such as rocks or gravel or shaped packings such as saddles, rings, stars, and the like. The packing media increases the surface area within the reactor and increases turbulence of the fluid particles flowing through the reactor.

In many processes, it is desirable to maximize the residence time of all fluid particles within the reactor. This is particularly true in the case of gas-exchange reactions, such as the absorption of gas by a liquid. Maximum residence time is typically achieved by plug flow. However, plug flow is difficult to achieve in gas-exchange reactions which are typically carried out in reactors exhibiting CSTR flow characteristics.

SUMMARY OF THE INVENTION

Accordingly, this invention provides a method of establishing plug flow, even for gas exchange reactions, in a reactor comprising packing media which establishes such plug flow. The packing media comprises a plurality of stacked "egg carton-shaped" plates. Each plate has an array of spaced-apart upwardly protruding dimples separated by downwardly protruding dimples. Preferably, the up dimples and down dimples are of a rounded cup-shape and are generally the same size.

The plates are stacked one upon another with the apex of the up dimples of one plate contacting and supporting the down dimples of the plate directly above. This forms rows of interengaging chambers or compartments between each pair of adjacent plates.

The up dimples comprise one or more, and preferably four openings which are spaced apart from &:he apex of the up dimple, preferably arranged symmetrically about the apex. The openings form transfer ports allowing the fluid to pass from a compartment in one row to one or more of the adjacent compartments in the row above.

At the point of contact between an up dimple of one plate and a down dimple of the next higher plate, there is provided a drain hole which extends vertically through the up and down dimples. The drain hole is smaller than the transfer ports.

Flow through the packing media is controlled by the transfer ports and, depending on the size and location of the transfer ports, may approach ideal plug flow. Moreover, the transfer ports create turbulence and shear within the fluid particles passing through the transfer ports which enhances mixing of the fluid particles. In other words, the ports and compartments serve to shuffle both the liquid and gas particles from one compartment to multiple different compartments, e.g., four in the illustrated embodiment.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE DRAWINGS

Figure 1:
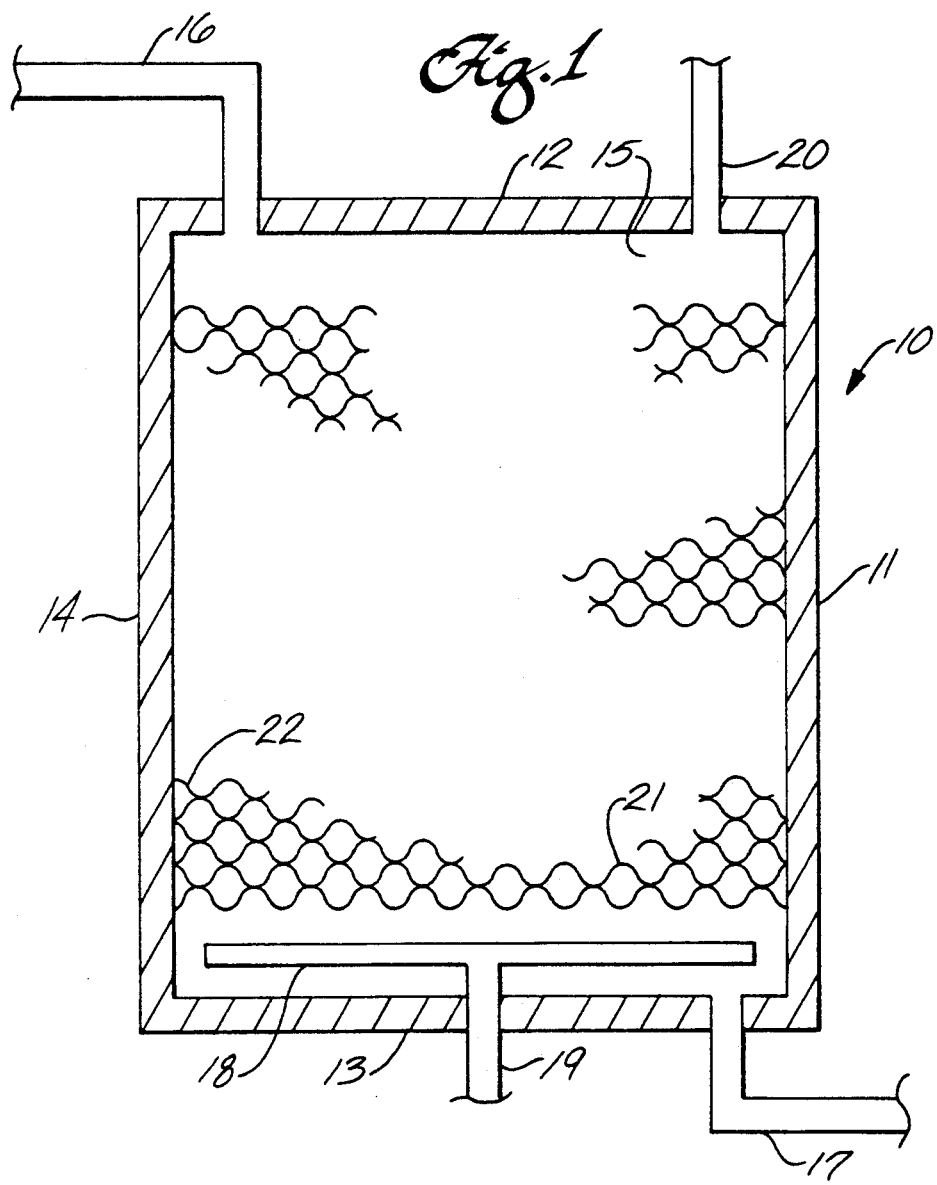
FIG. 1 is side cross sectional view of a chemical reactor constructed in accordance with the present invention.

The present invention is particularly applicable to the construction of reactors for gas-exchange reactions. A particularly preferred reactor made in accordance with the present invention is shown in FIG. 1. The reactor 10 comprises a closed tank 11 having top and bottom walls 12 and 13 and side walls 14. A liquid inlet line 16 is provided at the top of the tank 11 and a liquid outlet line 17 is provided at the bottom. Within the tank 11 adjacent the bottom wall 13, there is provided a gas sparger or diffuser 18. Connected to the gas sparger 18 and extending through the tank 11 is a gas inlet line 19. A gas outlet 20 is provided at the top of the tank 11. Within the interior of the reactor there is provided packing media 21 made in accordance with the present invention. The packing media 21 preferably extends from a lower level above the gas sparger 18 to an upper level spaced apart from the top wall 12 of the tank 11 to provide a head space 15.

Figure 2:
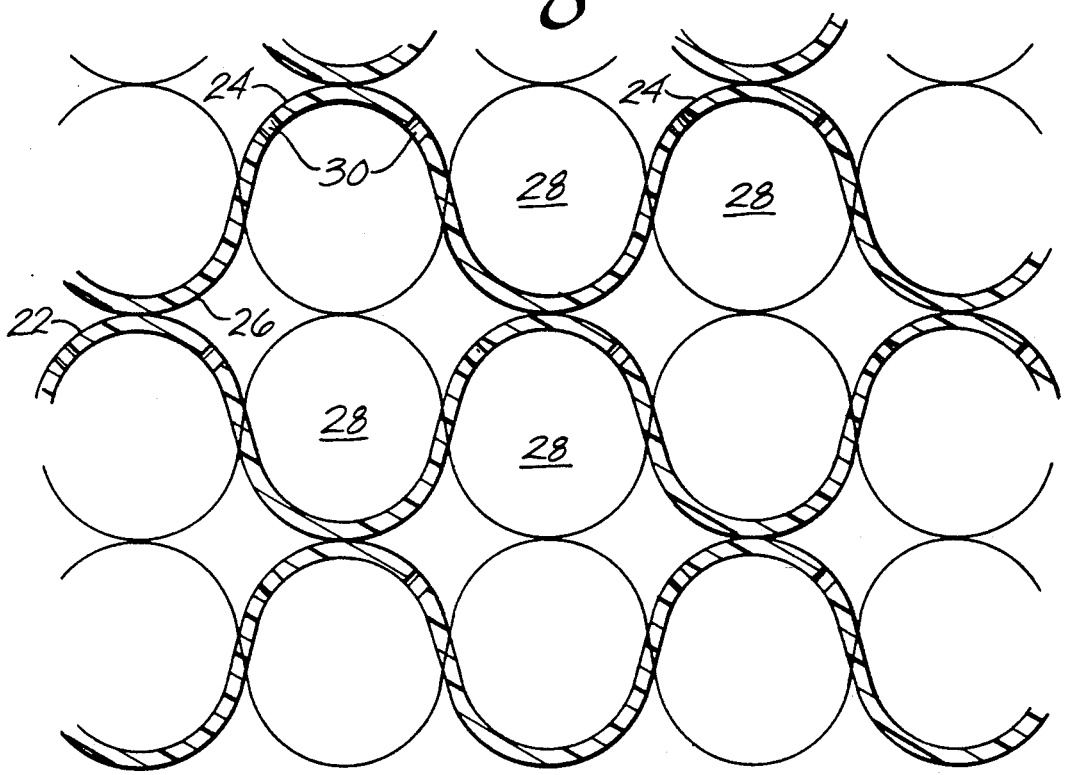
FIG. 2 is a side cross sectional view of a preferred packing media.

With reference to FIG. 2, the packing media 21 comprises a plurality of stacked plates 22. The plates 22 span the entire cross-section area of the reactor tank 11. This prevents the formation of channels for the passage of fluid particles around the packing media 21. The plates 22 can be made of any suitable non-reactive material. Depending upon the nature of the fluid particles introduced into the reactor, molded lightweight thermoplastic plates are presently preferred. The plates 22 may be formed in sections, if desired.

Each plate 22 has an "egg carton shape" comprising an array of alternating upwardly and downwardly protruding cup-shaped dimples 24 and 26 respectively. In such an alternating arrangement, the distance between the centers of adjacent up dimples 24 is generally the same as the distance between the centers of adjacent down dimples 26.

In the embodiment shown the distance between the centers of adjacent up and down dimples is about 6 inches, providing a dimple diameter along the mid plane of the plate 21 of about 6 inches. The depth of each dimple, as measured from the mid plane of the plate 22 is about 3 inches.

The plates 22 are stacked in an arrangement whereby the down dimples 26 of a first plate 22 are directly above and supported by the up dimples 24 of the adjacent plate 12 below the first plate 22. Up dimples 24 of one plate 22 are directly above down dimples 26 of the adjacent plate below thereby forming hollow compartments 28. Four compartments 28 are thus provided symmetrically about each point of contact between an up dimple 24 of one plate 22 and a down dimple 26 of the next higher plate 22. Accordingly, a row of compartments 28 is formed between each pair of adjacent plates 22. As used herein, a "row" of compartments means a horizontal array of compartments.

Arranged symmetrically about each compartment 28 in one row of compartments are four compartments 28 in the row above and four compartments 28 in the row below. Each of these surrounding compartments is offset from the "center" compartment by a 45 degree stacking angle. As used herein, "stacking angle" refers to the angle to horizontal of a line intersecting the center point of a compartment 28 in one row with the center point of an adjacent compartment in an adjacent row.

Figure 5:
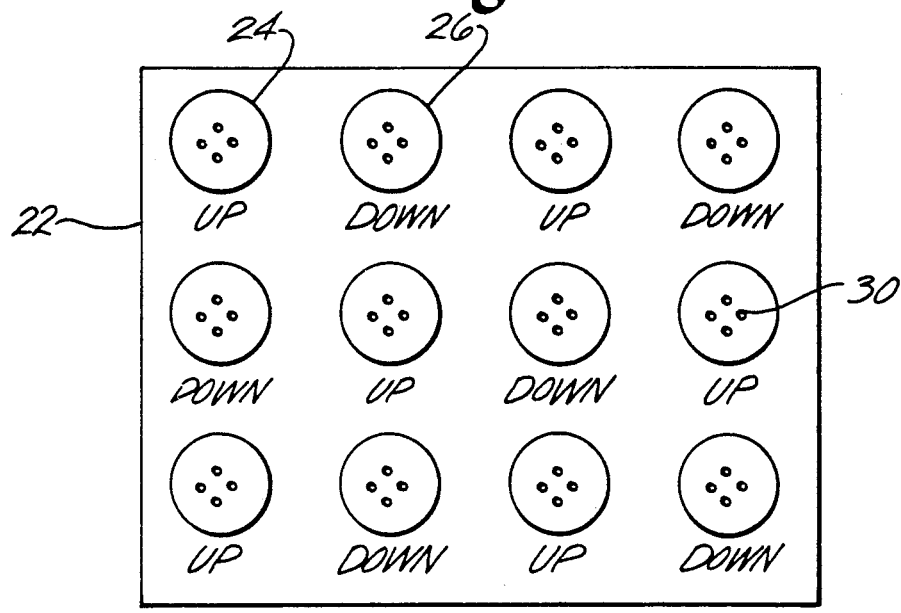
FIG. 5 is a schematic top view of dimple orientation.
Figure 6:
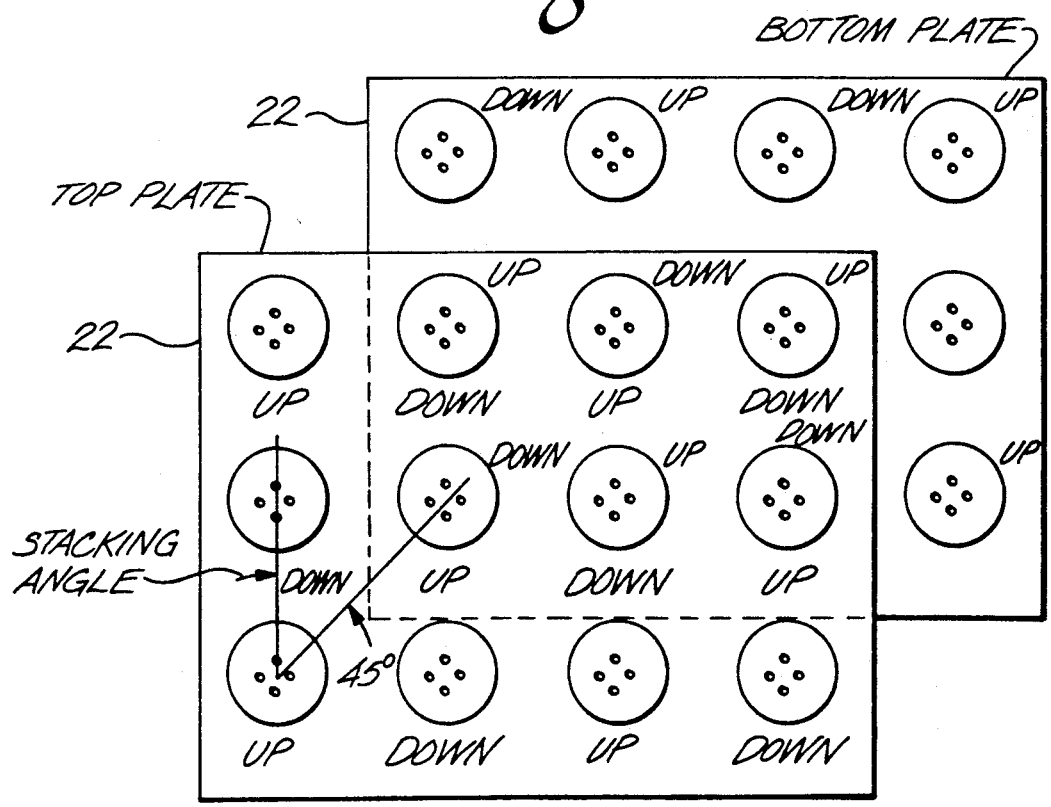
FIG. 6 is a schematic top view of contacting up and down dimples of separate layers of the packing media.

FIGS. 5 and 6 show dimple orientation schematically to more clearly show the shape of the invention. In both figures, the diameter of the dimples, relative to their separation, has been reduced. This is done to make the figures easier to interpret. As shown in the other figures, there are no flat surfaces on the plates, as the dimples 24 and 26 cover each plate's surface.

In FIG. 5, one of the many plates 22 that form the media is shown in plan view. The upward projecting dimples 24 and the downward projecting dimples 26 are labeled, and their orientation on the plane of the plate 22 is shown.

In FIG. 6, two of the many plates 22 that form the media are shown in plan view. One plate 22 is shown stacked above the other plate 22. The upper plate is drawn with solid lines, and the lower plate is drawn with dotted lines. In constructing a reactor, the plate boundaries would extend to the boundaries of the reactor, and thus each plate's boundaries is coincident with every other plate boundary, but for purposes of illustration, the boundaries are as shown. The orientation of the plates in the vertical dimension is shown, and the stacking angle is indicated. The stacking angle is a three-dimensional angle, and is 45° in its projection into the horizontal plane of either plate 22.

Figure 4:
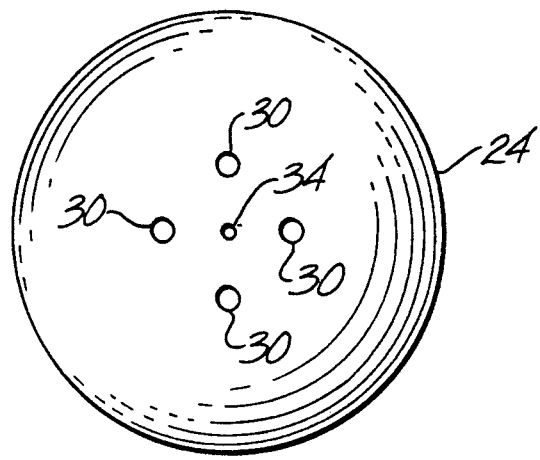
FIG. 4 is a top view of an up dimple.
Figure 3:
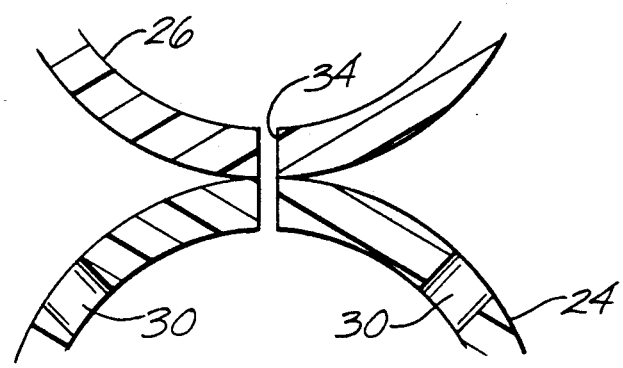
FIG. 3 is an enlarged cross sectional view of a contacting up dimple and down dimple.

With reference to FIGS. 3 and 4, each up dimple 26 comprises four openings forming transfer ports 30. The transfer ports 30 are spaced apart from the apex of the up dimple 24 a distance of about ⅓ of the dimple diameter and arranged symmetrically about the apex. The transfer ports 30 introduce zones of increased turbulence and shear within the packing media 21. This in turn promotes more efficient gas-liquid transfer than that created by conventional packing media. For example, a gas, i.e., compressible fluid introduced into the chamber and travelling in bubble form, is compressed by the ports upon passing therethrough, which serves to promote mass transfer and turbulence of the gas molecules in the bubble so that they move to the liquid/gas interface and even cross over this interface.

The shape and size of the transfer ports 30 is not critical. Generally, the smaller the size of the transfer ports 30, the greater the turbulence and shear. However, the smaller the transfer ports 30, the greater the pressure drop through the reactor 10. Consequently, the preferred transfer port size is that which yields the optimum combination of high turbulence and shear and therefore high gas-liquid transfer efficiency yet low pressure drop.

In a process involving the transfer of gaseous ozone to water, generally circular transfer ports 30 having a diameter of from about ¼ inch to about ¾ inch are presently preferred.

It is preferred, but not required, that the size of all transfer ports be about the same. This provides generally equal flow of fluid particles through each of the transfer ports which promotes uniform controlled flow through the media.

The distance of the transfer ports 30 from the apex of the up dimple 24 is not critical but is selected so that a large pocket of fluid does not collect and remain stagnant at the top of each compartment 28. The precise locations of the transfer ports 30 relative to each other are also not critical but preferably selected to provide passage of an upwardly flowing fluid from one compartment 28 in a row to each of the four adjacent compartments 28 in the row above. In such an arrangement, a fluid, e.g., a gas or liquid, flowing upwardly through the packing media 21 will flow from one compartment 28 through the transfer ports 30 evenly into the four adjacent compartments 28 in the row above. Likewise, a fluid flowing downwardly through the packing media 21 will flow from each compartment 28 in one row through the transfer ports 30 into each of the four adjacent compartments 28 in the row below.

With reference to FIG. 3, there is provided a drain hole 34 which extends through the apex of each up dimple 24 and nadir of each down dimple 26 to provide a passage from the bottom portion of one compartment 28 into the compartment 28 directly below. The drain hole 34 is preferably smaller than the transfer ports 30 so that the bulk of fluid flowing through the packing media 21 passes through the transfer ports 30. However, the drain hole 34 allows some passage of fluid during the operation of the reactor and allows fluids to drain from the bottom portion of the compartments 28 when the reactor is shut down. For the draining of water, a drain hole 34 having a diameter of about 3/32 inch is presently preferred, particularly in combination with transfer ports 30 having a diameter of about ½ inch.

In a particularly preferred embodiment of the invention, the plates 22 are made of a thermoplastic material. The drain holes 34 are established by first stacking one plate 22 onto another so that the up dimples 24 of the lower plate 22 is directly below and in contact with the down dimples 26 of the upper plate 22. A hot pin or probe is caused to pierce the plates at the point of contact between the up and down dimple forming the drain hole 34. At the same time, the heat from the probe welds the plastic of the up and down dimples 24 and 26 together, thereby preventing lateral movement of one plate relative to the other. Such lateral movement is undesirable because of a lateral shift of the portion of the drain hole 34 through the down dimple 26 from the portion of the drain hole 34 in the up dimple 24 could block passage of fluid through the drain hole.

The preceding description has been presented with reference to the particularly preferred embodiment of the invention which is shown in the accompanying drawings. It is apparent that many alterations and changes in the described method and structures can be made without departing from the scope of the invention.

For example, the relative size of the transfer holes, their location and number may be varied, if desired. Four (or at least multiples of four) symmetrically positioned, equally sized transfer ports are preferred as such an arrangement provides a uniform even flow of fluids through the packing media. However, if controlled uniform flow is not critical, fewer or more transfer ports may be used. Moreover, the locations need not be symmetrical about the apex. If desired, the transfer ports may be located on the down dimples. Likewise, the relative size of the transfer ports may vary. In any such arrangement, the transfer ports still provide the advantage of creating zones of turbulence and shear within the media which enhances gas-liquid exchange.

In the embodiment shown, the up and down dimples are generally the same size, having a rounded cup-shape, a depth or height of about 3 inches as measured from the mid-plane of the plate and a spacing, i.e. distance between the centers of adjacent dimples of about 6 inches. It is understood that the shape and size of the up and down dimples may vary as desired. For example, rather than rounded cup-shape dimples, the up and down dimples may be shaped like tetrahedrons or truncated tetrahedrons. It is also apparent that the shape and size of the up dimples may differ from the shape and size of the down dimples.

The up and down dimples are also shown in an uniform array which is preferred to provide a controlled uniform flow through the packing media. However, if controlled flow is not critical, the dimples may be arranged randomly about each plate.

It is apparent that the packing media is applicable to numerous other reactions in addition to gas-exchange reactions. If desired, the packing media could be made of or coated with a catalytic substance to effect a catalytic reaction within the reactor.

The invention has been described for countercurrent flow, but applies equally to cocurrent flow. For example, gas outlet 20 could be used as an inlet for a second liquid, and gas inlet 19 could be used as an outlet, such that cocurrent flow of two liquids through the reactor is possible. Similarly, liquid outlet 17 could function as an inlet for a second gas, and liquid inlet line 16 could function as an outlet, thereby achieving cocurrent flow of two gases. Other variations may also be feasible.

Accordingly, the foregoing description should not be read as pertaining only to the precise structures described, but rather should be read consistent with and as support for the following claims which are to have their fullest fair scope.

What is claimed is:

1. A method of mixing fluids flowing through a reactor comprising a plurality of solid stacked plates, each plate having an array of upwardly protruding dimples separated by downwardly protruding dimples, each upwardly protruding dimple having transfer ports thereon, wherein each pair of adjacent plates are stacked so that the downwardly protruding dimples of one plate are in line with an contact the upwardly protruding dimples of the adjacent plate below to thereby form a row of hollow compartments, wherein the transfer ports communicate one of the compartments with a plurality of different compartments in the adjacent row of compartments, the method comprising the steps of:

causing the fluids to flow through the stacked plates in a direction substantially parallel to a direction in which the plates are stacked; and mixing the fluids as they pass through the stacked plates by causing each fluid to flow through the transfer ports and mix together thereat using turbulence and shearing forces created by the transfer ports to thereby form a mixture of the fluids, and distributing the mixture of the fluids from the one compartment to the different compartments in communication therewith.

2. The method of claim 1, wherein one of the fluids is a liquid and another of the fluids is a gas, and wherein the fluids are caused to flow countercurrent through the stacked plates.

3. The method of claim 2, wherein the stacking direction is vertical, and, in the step of causing the fluids to flow, the gas is caused to flow upward through the stacked plates and the liquid is caused to flow downward.

4. The method of claim 2, wherein gas bubbles and liquid are mixed at the transfer ports.

5. The method of claim 1, wherein each upwardly protruding dimple has an apex and a drain hole at the apex, and each downwardly protruding dimple has a nadir and a drain hole at the nadir, and fluid is drained form the reactor through the drain holes.

6. The method of claim 1, wherein at least one of the fluids is a compressible fluid, and, in the step of causing the fluids to flow, the fluids are caused to flow countercurrent through the stacked plates, and wherein the stacking direction is vertical, and the method further comprising the steps of introducing the compressible fluid into the reactor below the stacked plates, and introducing another fluid into the reactor above the stacked plates.

7. The method of claim 1, wherein the fluids are caused to flow cocurrent through the reactor.

8. The method of claim 7, wherein the stacking direction is vertical, and the method further comprises the step of introducing the fluids into the reactor below the stacked plates.

9. The method of claim 1, wherein one of the fluids is compressible, and the step of mixing further comprises compressing the compressible fluid as it flows through the transfer ports to promote mass transfer.

10. The method of claim 1, wherein the reactor is a plug flow reactor, and the method further comprises the steps of introducing each fluid into the reactor, and, after each fluid flows through the stacked plates, discharging each fluid from the reactor, so as to achieve plug flow through the reactor.

11. The method of claim 1, wherein two of the fluids are liquids, and wherein the liquids are caused to flow cocurrent through the stacked plates.

12. The method of claim 11, wherein the stacking direction is vertical, and, in the step of causing the fluids to flow, the liquids are caused to flow downward through the stacked plates.

13. The method of claim 1, wherein two of the fluids are gases, and the gases are caused to flow cocurrent through the stacked plates.

14. The method of claim 13, wherein the stacking direction is vertical, and, in the step of causing the fluids to flow, the gases are caused to flow upward through the stacked plates.

15. The method of claim 1, wherein the fluids are caused to flow cocurrent through the reactor.

16. The method of claim 1, wherein at least one of the fluids is a compressible fluid, and, in the step of causing the fluids to flow, the fluids are caused to flow cocurrent through the stacked plates, and wherein the stacking direction is vertical, and the method further comprises the steps of introducing the compressible fluid into the reactor below the stacked plates, and introducing another fluid into the reactor below the stacked plates.

17. The method of claim 1, wherein at least one of the fluids is an incompressible fluid, and, in the step of causing the fluids to flow, the fluids are caused to flow cocurrent through the stacked plates, and wherein the stacking direction is vertical, and the method further comprising the steps of introducing the incompressible fluid into the reactor above the stacked plates, and introducing another fluid into the reactor above the stacked plates.

18. The method of mixing fluids flowing through a reactor comprising a reaction chamber with a plurality of solid stacked plates coextensive with walls of the chamber, each plate having an array of upwardly protruding dimples separated by downwardly protruding dimples, each upwardly protruding dimple having an apex, a drain hole at the apex, and four transfer ports thereon arranged symmetrically about the apex, each transfer port having a diameter of from about $\frac{1}{4}$ to about $\frac{3}{4}$ inch and spaced from the apex by a distance of about $\frac{1}{8}$ of a dimple diameter, wherein each pair of adjacent plates are stacked so that the downwardly protruding dimples of one plate are in line with and contact the upwardly protruding dimples of the adjacent plate below to thereby form a row of hollow compartments, wherein each compartment of one row of compartments is offset from adjacent compartments in adjacent rows of compartments by about a 45° stacking angle, and the transfer ports communicate one of the compartments with a plurality of different compartments in the adjacent row of compartments, each downwardly protruding dimple having a nadir and a drain hole at the nadir of about 3/32 inch in diameter, the method comprising the steps of:

causing the fluids to enter the reaction chamber and flow through the stacked plates in a direction substantially parallel to a direction in which the plates are stacked, and to flow out of the reaction chamber so as to achieve plug flow; and mixing of the fluids as they pass through the stacked plates by causing each fluid to flow through the transfer ports and mix together thereat using turbulence and shearing forces created by the transfer ports to thereby form a mixture of the fluids, and distributing the mixture of the fluids from the one compartment to the different compartments in communication therewith.

* * * * *